US011157153B2

(12) United States Patent
Sandu et al.

(10) Patent No.: US 11,157,153 B2
(45) Date of Patent: Oct. 26, 2021

(54) PROFILE INFORMATION LAYOUT CUSTOMIZATION IN COMPUTER SYSTEMS

(71) Applicant: Microsoft Technology Licensing, LLC, Redmond, WA (US)

(72) Inventors: Andreea Sandu, Kirkland, WA (US); Iuri Tolica, Seattle, WA (US); Srinivas Pushkar Ravipati, Redmond, WA (US); Ion Morozan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 108 days.

(21) Appl. No.: 16/357,072

(22) Filed: Mar. 18, 2019

(65) Prior Publication Data

US 2020/0301571 A1  Sep. 24, 2020

(51) Int. Cl.
*G06F 3/0484* (2013.01)
*G06F 3/0482* (2013.01)
*G06Q 50/00* (2012.01)

(52) U.S. Cl.
CPC ........ *G06F 3/04845* (2013.01); *G06F 3/0482* (2013.01); *G06Q 50/01* (2013.01)

(58) Field of Classification Search
CPC .... G06F 3/04845; G06F 3/0482; G06Q 50/01
See application file for complete search history.

(56) References Cited

U.S. PATENT DOCUMENTS

| 2012/0063577 | A1 | 3/2012 | Foster |
| 2012/0254833 | A1 | 10/2012 | Chang et al. |
| 2015/0295914 | A1 | 10/2015 | Kelishadi |
| 2017/0076328 | A1 | 3/2017 | Suzuki |
| 2017/0147187 | A1 | 5/2017 | Mu et al. |
| 2018/0046985 | A1 | 2/2018 | Monaco |
| 2018/0164970 | A1* | 6/2018 | Volkerink ............... G06F 9/451 |
| 2019/0034504 | A1* | 1/2019 | Berwick ............. G06F 3/04817 |

(Continued)

FOREIGN PATENT DOCUMENTS

CN       102012812 B       8/2014

OTHER PUBLICATIONS

"International Search Report and Written Opinion Issued in PCT Application No. PCT/US20/021623", dated May 13, 2020, 13 Pages.

(Continued)

*Primary Examiner* — Andrey Belousov
(74) *Attorney, Agent, or Firm* — Shook, Hardy & Bacon LLP

(57) ABSTRACT

Techniques for customization of user interfaces in a computing system are disclosed herein. In one embodiment, a method includes receiving, at a server, data representing a change signal from a first client device of a first user. The change signal indicates that the first user has modified a display layout of profile information of a person of interest viewed by the first user on the first client device. The method also includes identifying a second user having a viewing context that is sufficiently similar to the first user. The method further includes automatically applying the modified display layout of the profile information on a second client device corresponding to the identified second user upon receiving a request from the second user for viewing the profile information of the person of interest.

20 Claims, 7 Drawing Sheets

(56) References Cited

OTHER PUBLICATIONS

"Remote Desktop Software", Retrieved From https://en.wikipedia.org/w/index.php?title=Remote_desktop_software&oldid=829260749, Retrieved on Jul. 21, 2020, 3 Pages.

"Desktop Sharing", Retrieved From https://en.wikipedia.org/w/index.php?title=Desktop_sharing&oldid=826852107, Retrieved on Jul. 21, 2020, 3 Pages.

\* cited by examiner

PROFILE INFORMATION LAYOUT CUSTOMIZATION IN COMPUTER SYSTEMS

BACKGROUND

Electronic communication generally refers to all kinds of computer-mediated communication in which users electronically exchange messages with one another either individually or in groups. For example, users can exchange or disseminate information via webpages, emails, online forum posts, text and instant messages, social network postings, and video chats. Electronic communication technology can thus allow online collaboration of users to enable efficient dissemination of information, geographical dispersion of users, and/or sharing of common interests.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Certain computing systems can be configured to provide computing services that delivers profile information of a user (referred to as herein as "profile information") or previews thereof to viewers of the information. For example, Linkedin® shows a preview of a person with a user name, a title, a number of common connections with a viewer when the person's name or photo is hovered over. In another example, a Facebook® webpage can show a user interface referred to as a "hovercard" having profile information when a viewer hovers over the user's name or avatar with a mouse or other pointing devices. In further examples, previews of profile information can also be shown in email clients, calendar application, word processors, and/or other suitable types application. In such examples, the previews can also include organizational structures, emails exchanged with the users previously, photos, titles, calendar items, or other suitable information organized as cards, sections, tabs, or in other suitable user interfaces.

One drawback of the previews, or "hovercards," is that information displayed in such previews are often static irrespective of activities/interests of viewers. For example, when a viewer is viewing information of a new contact, the viewer may be more interested in basic information such as email addresses, phone numbers, a geographical location, a title, or other general information of the new contact. In contrast, when a viewer is viewing information of a colleague, the viewer may be more interested in emails and/or instant message chats previous exchanged with the colleague than a name, a title, or contact information of the colleague. In another example, when a viewer is viewing information of his/her manager, the viewer may be more interested in viewing a calendar of the manager in order to setup an appointment for discussion. Static user interfaces for displaying profile information may not have sufficient flexibility to provide such customized display. As such, a viewer may only locate desired profile information through multiple interactions with the computing system, and thus incur significantly costs in computing, storage, and/or network resource consumption of the computing system.

Several embodiments of the disclosed technology can address at least some of the foregoing drawbacks by implementing adaptive user interfaces (referred to herein as a "user interface" for brevity) in accordance with a viewing context of a viewer and a person of interest to the viewer. By adapting the user interfaces, a computing system can facilitate the viewer to efficiently locate and access desired profile information of the person of interest with a small number of interactions. As such, user experience as well as productivity of the users of the computing system may be improved.

In one implementation, profile information of a user interface of the person of interest can be organized as sections, tabs, lists, or other suitable divisions (collectively referred to herein as "sections"). A computing system (e.g., executing on a remote server) supporting the user interface can be configured to allow the user to add, remove, modify, reorder, rearrange, or otherwise modify one or more sections of the user interface. As such, in the examples above, the viewer viewing information of a colleague may be presented with a view having the emails and/or instant messages previous exchanged with the colleague on a top section of the user interface instead of basic contact information of the colleague. In another example, the electronic communication application may present a view with a calendar of the manager on a top section of the user interface when the viewer is viewing information of his/her manager. In further examples, different views of the same person of interest can be presented to different users according to the corresponding viewing context. Thus, by allowing customization or adaptation of the user interfaces for presenting different views, layouts, or templates of profile information to a viewer, the computing system can allow a viewer to efficiently locate certain types of profile information that is more relevant to the viewer than other types of information.

In certain embodiments, the foregoing customization technique can be applied globally (e.g., to all users in an organization, social network, etc.), to certain categories of users (e.g. to all people in teams, departments, etc.), or to only certain users based on suitable criteria. In other embodiments, the computing system can also be configured to capture such user interface customizations as change signals, develop/update interface models of user interface customization patterns based on the captured change signals, and change or suggest a template of user interfaces for other users with similar viewing context at runtime. As such, the computing system can not only save the customization of the viewer but also identify other viewers with similar viewing context in order to present profile information in a similar manner via a suggested display layout or layout.

As used herein, a viewing context generally refers to suitable information related to viewing activities of the viewer and the person of interest being viewed by the viewer. For instance, a viewing context can include relationship information between the viewer and the person of interest. Examples of relationship information can include past communications between the viewer and the person of interest via emails, instant messages, or other suitable electronic communication messages. Other examples of relationship information can also include a relationship distance within an organization, a social network, or other suitable groups between the viewer and the person of interest. For instance, the viewer and the person of interest may have a short relationship distance by being in the same department, group, social circle, etc. In other examples, the viewer and the person of interest may have a long relationship distance by being in different organizations, social groups, etc.

A viewing context can also include information related to the viewer (referred to herein as "viewer information"). Such viewer information can be collected with consent of the viewer after sufficient notice, can be anonymized to remove personal identifiable information, or can be obtained in other suitable manners according to which the viewer's privacy is protected. For example, viewer information can be collected in an enterprise environment and can include an industry/field the viewer is in (e.g., finance, software, medicine, etc.), a title of the viewer (e.g., software engineer, architect, assistant, doctor, lawyer, receptionist, insurance agent, artist, etc.), a role of the viewer (e.g., manager, assistant, product manager, chief executive officer, etc.), a physical location the viewer (e.g., the United States, Europe, Asia, etc.), and/or an education level of the viewer (e.g., student, bachelor of science, doctor of philosophy, juris doctor, etc.), and/or other suitable information of the viewer.

A viewing context can also include usage pattern information of the viewer when viewing the person of interest. Example of usage pattern information can include data representing a time of day of viewing activities by the viewer, a section of the user interface clicked by the viewer most often, meetings the viewer has attended or being invited to, topics discussed between the viewer and the user via emails, instant messages, or other suitable electronic communication channels. Similar to the viewer information, usage pattern information can also be captured, for instance, by the computing system, with consent of the viewer after sufficient notice and can be anonymized to remove personal identifiable information. In further implementations, a viewing context can also include a type of client device the viewer is using, a network access capability of the client device, and/or other suitable types of viewing context parameters.

Based on the viewing context data and change signals collected from the viewer, a model developer (e.g., as a component of the computing system) can be configured to develop an interface model that can be used to predict a probability that another viewer would find the display layout customized by the viewer useful. In some embodiments, the interface model can include data representing a set of weight values corresponding to various viewing context parameters and a decision tree derived through a machine learning process. For example, the model developer can be configured to identify the various weight values using a "neural network" or "artificial neural network" configured to "learn" or progressively improve performance of tasks by studying known examples. In certain implementations, a neural network can include multiple layers of objects generally refers to as "neurons" or "artificial neurons." Each neuron can be configured to perform a function, such as a non-linear activation function, based on one or more inputs via corresponding connections. Artificial neurons and connections typically have a contribution value that adjusts as learning proceeds. The contribution value increases or decreases a strength of an input at a connection. Typically, artificial neurons are organized in layers. Different layers may perform different kinds of transformations on respective inputs. Signals typically travel from an input layer, to an output layer, possibly after traversing one or more intermediate layers. In some implementations, the model develop can also be configured to update the model using feedback from the viewer and other viewers on suggested display layouts. In other embodiments, the model developer can be configured to perform such model development based on administrator provided rules or via other suitable techniques.

Through the machine learning process, viewers and display layouts can be clustered based on an intersection of the captured change signals such as relationships to the viewer and/or person of interest, interests of the viewer and/or the person, and/or usage patterns of the viewer. During runtime, the computing system (or a component thereof) can be configured to identify and suggest one or more display layouts for other viewers based on corresponding viewing context of the other viewers and the interface model. For example, the computing system can be configured to suggest a display layout to a viewer for confirmation based on a display layout customized by another viewer who is in the same department when viewing the same person of interest. In another example, the computing system can automatically apply the suggested display layout while allowing the viewer to modify the display layout later on. In further examples, the computing system can automatically update a display layout for multiple viewers in response to an update of the developed interface model based on a captured change signal. Thus, different views of the user interface for viewing profile information of the person of interest can be presented to the viewers dynamically.

In certain embodiments, when a viewer selects a suggested display layout (or accepts an automatically applied display layout), a view of the display layout can be further customized based on, for instance, user activity (e.g., the most used section(s) in different times of the day or clicks on different sections). For example, a view of a user can be presented with previously exchanged emails during normal working hours while a calendar is presented after hours, or vice versa. As such, the computing system can present different views of the same user interface to the same viewer for different viewing context of the viewer.

Several embodiments of the disclosed technology can thus efficiently present profile information of a person of interest to viewers. Instead of statically presenting certain pre-configured profile information of the person of interest to a viewer, a display layout customized by another viewer can be suggested and/or automatically applied for the viewer based on a viewing context of the viewer and the developed interface model. As such, the viewer can more efficiently locate desired profile information of the person of interest with a small number of interactions. Thus, a computing load and/or network bandwidth used by the computing system for providing such a computing service may be reduced.

DETAILED DESCRIPTION

Figure 1A:
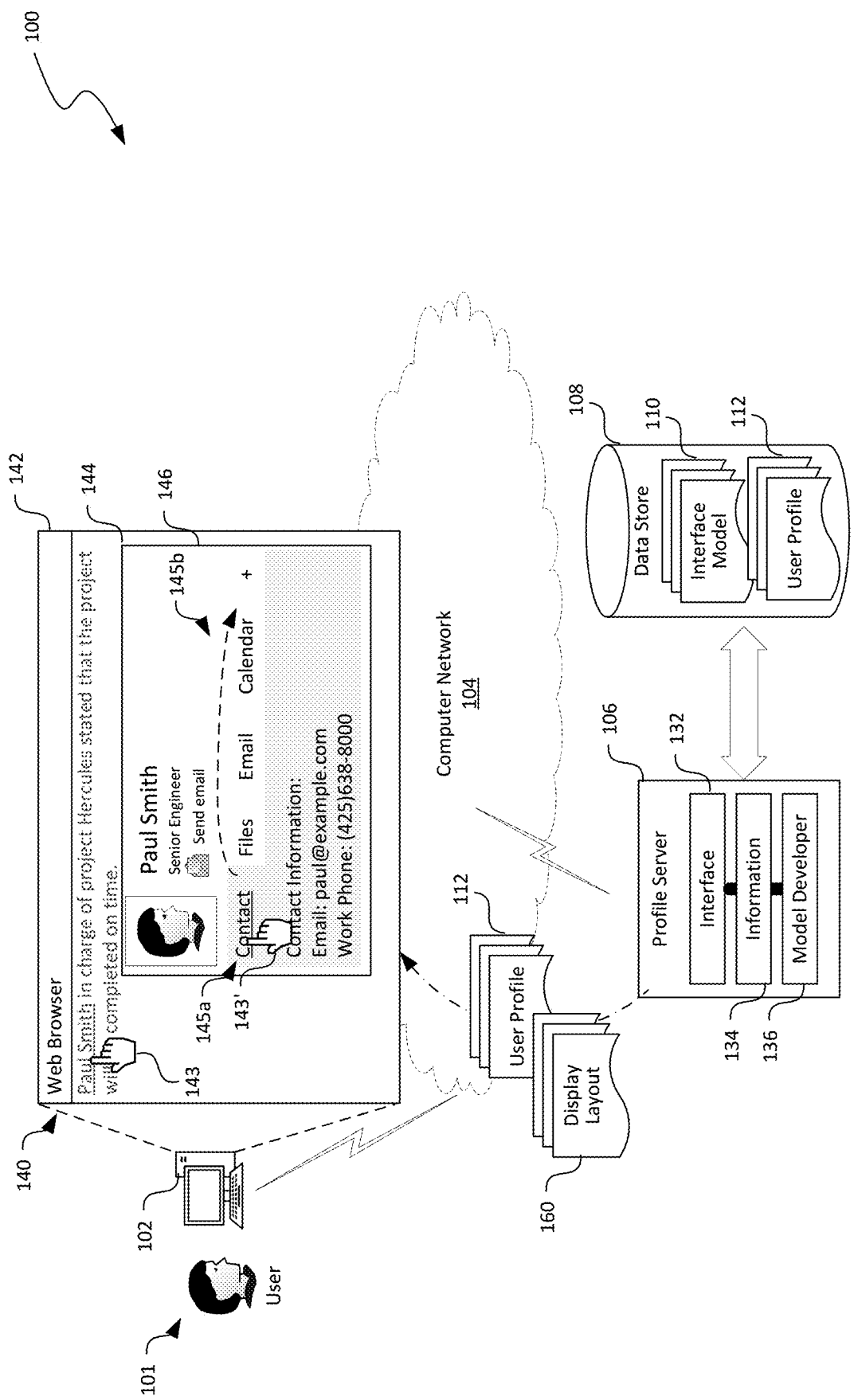
FIGS. 1A-1D are schematic diagrams illustrating a computing system implementing customization of user interface layout during certain stages of operation in accordance with embodiments of the disclosed technology.

Certain embodiments of systems, devices, components, modules, routines, data structures, and processes for customization of user interfaces in computing systems are described below. In the following description, specific details of components are included to provide a thorough understanding of certain embodiments of the disclosed technology. A person skilled in the relevant art will also understand that the technology can have additional embodiments.

The technology can also be practiced without several of the details of the embodiments described below with reference to FIGS. 1A-4.

As used herein, the term "display layout" generally refers to a structure, format, or arrangement of outputting data items on a user interface. In one example, a user interface can include multiple sections, and a display layout of the user interface includes a sequence, a relative position, a grouping, or other suitable arrangement of the multiple sections. For instance, one section may be a first or default section of a first display layout while another section may be a first or default section of a second display layout.

Also used herein "profile information" of a person generally refers to any information of interest regarding the person to a viewer of such information. In one example, profile information can include basic contact information such as name, physical location, email address, phone number, etc. In another example, profile information can include a title, position, education profile, work experience, professional membership, or other suitable job-related information. In yet another example, profile information can include one or more webpages of the person, for example, on Facebook.com or Linkedin.com. In further examples, profile information can include emails, instant messages, documents, and/or other suitable types of files or messages that the person has created, viewed, edited, shared, responded to, forwarded, or otherwise related to.

As used herein, an "interface model" generally refers to a mathematical representation of a correlation between a display layout of profile information and a viewing context of one or more users. In certain implementations, the correlation can be determined via machine learning. For instance, a hypothesis set for various viewing context parameters can be taken initially before training starts with an example data set. Then, a set of functions that define similar characteristics as specified by, for example, linear regression and from the set of functions we will choose one function that fits the example data set. In other implementations, the correlation can also be determined using a "neural network" to "learn" or progressively improve performance of tasks by studying the examples data set, or other suitable techniques.

Further used herein, the term "viewing context" generally refers to any suitable information related to viewing activities of a viewer and a person of interest being viewed by the viewer. In one example, a viewing context can include relationship information between the viewer and the person of interest. In another example, a viewing context can also include viewer information, such as an industry/field the viewer is in (e.g., finance, software, medicine, etc.), a title of the viewer (e.g., software engineer, architect, assistant, doctor, lawyer, receptionist, insurance agent, artist, etc.), a role of the viewer (e.g., manager, assistant, product manager, chief executive officer, etc.), a physical location the viewer (e.g., the United States, Europe, Asia, etc.), and/or an education level of the viewer (e.g., student, bachelor of science, doctor of philosophy, juris doctor, etc.), and/or other suitable information. In further examples, a viewing context can also include usage pattern information, such as data representing a time of day of viewing activities by the viewer, a section of the user interface clicked by the viewer most often, meetings the viewer has attended or being invited to, topics discussed between the viewer and the user via emails, instant messages, or other suitable electronic communication channels.

In certain computing systems, profile information of a person of interest is typically presented to a viewer in a static manner irrespective of a viewing context referred to above. For example, when a viewer is viewing information of a new contact, the viewer may be more interested in basic information such as email addresses, phone numbers, a geographical location, a title, or other general information of the new contact. In contrast, when a viewer is viewing information of a colleague, the viewer may be more interested in emails and/or instant message chats previous exchanged with the colleague than a name, a title, or contact information of the colleague. As such, the viewer may only locate desired profile information of the person through browsing, searching, and/or other types of interactions with the computing systems. Thus, user experience as well as productivity of the viewer may be negatively impacted.

Several embodiments of the disclosed technology can address at least some of the foregoing drawbacks by implementing adaptive user interfaces (referred to herein as a "user interface") in accordance with a viewing context of a viewer and a person of interest to the viewer. By adapting the user interfaces, A computing system can facilitate the viewer to efficiently locate and access desired profile information of the person of interest with a small number of interactions. In addition, the computing system can also capture such user interface customizations as change signals, develop/update interface models of user interface customization patterns based on the captured change signals, and change or suggest a template of user interfaces for other users with similar viewing context at runtime. As such, the computing system can not only save the customization of the viewer but also identify other viewers to present profile information in a useful manner via a suggested display layout or layout, as described in more detail below with reference to FIGS. 1A-4.

FIGS. 1A-1D are schematic diagrams illustrating A computing system 100 implementing customization of user interface layout during certain stages of operation in accordance with embodiments of the disclosed technology. In FIG. 1A and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 1A, the computing system 100 can include a computer network 104 interconnecting a client device 102 with a profile server 106 that is operatively coupled to a data store 108. The computer network 104 can include an intranet, a wide area network, an internet (e.g., the Internet), or other suitable types of computer network. Even though particular components of the computing system 100 are shown in FIG. 1A, in other embodiments, the computing system 100 can also include additional and/or different components or arrangements. For example, in certain embodiments, the computing system 100 can also include additional network storage devices, additional servers, and/or other suitable components (not shown). In other embodiments, the data store 108 may be integrated into the profile server 106 or may be located remotely from the profile server 106.

The client devices 102 can include a computing device that facilitates a corresponding user 101 accessing suitable types of computing services provided by the profile server 106 and/or other suitable computing facilities (not shown) via the computer network 104. In the illustrated embodiment, the client device 102 includes a desktop computer. In other embodiments, the client device 102 can also include a laptop computer, a tablet, a smartphone, or other suitable types of computing device. The client device 102 can correspond to a user 101. Though only one client device 102 and corresponding user 101 are shown in FIG. 1A for illustration purposes, in other embodiments, the computing system 100 can facilitate operations of any suitable numbers of users 101 (not shown) via corresponding client devices 102 (not shown).

The client devices 102 can individually include one or more processors that are configured to execute suitable instructions to provide an application 140. For instance, as shown in FIG. 1A, the application 140 can include a web browser 142 configured to allow the user 101 to browse various web pages 144. In other examples, the application 140 can include an email client, a calendar application, a word processor, or other suitable types of application.

The application 140 can be configured to detect a user input representing a request for profile information of a person of interest and retrieve the requested profile information from the profile server 106. For example, as shown in FIG. 1A, the web page 144 shows a news article having a reference to a person (e.g., "Paul Smith" as the person's name). Upon detecting a user input, such as a mouseover, a click, a tap, a voice command, or other suitable types of input (shown in FIG. 1A as a cursor 143) on the reference to the person (e.g., "Paul Smith"), the application 140 can request profile information of the person of interest from the profile server 106. In other examples, the user input detected by the application 140 can also include any suitable types of user input directed to a person's alias, employee number, photo, screen name, or other suitable types of identification.

As shown in FIG. 1A, the data store 108 can include records of an interface model 110 and user profile 112. The interface model 110 can be configured to provide a suggested display layout 160 for outputting profile information of a person of interest to the user 101 based on a viewing context of the user 101. As discussed in more detail below with reference to FIGS. 1B-1D, the interface model 110 can be developed and/or updated based on change signals 114 (shown in FIG. 1B) captured from the client device 102. In certain embodiments, the profile server 106 can be configured to develop and/or update the interface model 110. In other embodiments, one or more other servers (not shown) can be configured to develop and/or update the interface model 110 in the data store 108.

The user profile 112 can contain profile information of people, groups, departments, organizations, or other suitable types of entity. Such profile information can be collected and stored in the data store 108 with user consent after sufficient notice, collected from publicly available information, collected as a part of condition for employment, or via other suitable channels in which privacy is adequately protected. For example, the user profile 112 can be collected from employment records and include information of an employee in an enterprise, such as title, position, contact information, etc. In another example, the user profile 112 can be collected from publicly available information such as court records, real estate records, public phone numbers, physical addresses, etc. In further examples, the user profile 112 can be collected from a social network (or other suitable types of social platform) and include information provided by users of the social network. In certain instances, only a subset of the collected information from social networks can be shown to other users or groups of users with user consent. In other instances, the entire set of the collected information may be available to other users.

The profile server 106 can also include one or more processors executing suitable instructions to provide components for facilitating retrieval of profile information by the client device 102. As shown in FIG. 1A, the profile server 106 can provide an interface component 132, an information component 134, and a model developer 136. Even though particular components are shown in FIG. 1A for illustration purposes, in other embodiments, the profile server 106 can also include a network component, a web service component, and/or other suitable types of component. In further embodiments, the model developer 136 can be hosted on one or more servers (not shown) separate from the profile server 106.

The interface component 132 can be configured to receive the request for profile information from the client device 102. In certain embodiments, the interface component 132 can also be configured to receive a viewing context of the user 101 with user consent along with the request for profile information. In other embodiments, the interface component 132 can be configured to retrieve at least a part of the viewing context of the user 101 from, for instance, the user profile 112 in the data store 108, based on an identification of the user 101 or other information included in the request. In further embodiments, the interface component 132 can be configured to provide the requested user profile 112 as well as a display layout 160 for outputting the user profile 112 in the application 140 to the client device 102. The interface component 132 can include network protocol stacks, network load balancers, and/or other suitable types of component.

Upon receiving the request for profile information from the client device 102, the interface component 132 can be configured to forward the received request along with viewing context of the user 101 to the information component 134 for further processing. In response, the information component 134 can be configured to retrieve a suitable record of user profile 112 from the data store 108 and determine a display layout 160 for outputting the retrieved user profile 112 based on the viewing context of the user 101. In certain implementations, the information component 134 can instruct the application 140 to suggest the determined display layout 160 for confirmation by the user 101. In other implementations, the information component 134 can instruct the application 140 to automatically apply the determined display layout 160, with an option for the user 101 to modify the automatically applied display layout 160.

In certain embodiments, the information component 134 can be configured to compare the viewing context of the user 101 to one or more viewing context of other users (not shown) contained in the interface model 110. In one implementation, such a comparison can be performed using assigned numerical values for individual viewing context parameters and corresponding weight values in the interface model 110. For instance, a value of ten can be assigned to a close relationship between the user 101 and the person of interest, such as colleagues in a working group, while a value of one can be assigned to a distant relationship such as when the user 101 and the person of interest are total strangers. The assigned values can then be multiplied by corresponding weight values (e.g., in a range of zero to one) and subsequently summed to derive a total value. In one embodiment, the total value can represent a probability that the user 101 would find the display layout 160 useful. In other embodiments, the total value can correspond to a similarity level measure between viewing context of the user 101 and those of the other users.

In one embodiment, upon deriving the total value, the information component 134 can be configured to determine whether the derived total value (e.g., as a probability) exceeds a preset threshold. If the total value exceeds the preset threshold, the information component 134 can select a display layout 160 corresponding to the viewing context in the interface model 110 as the determined display layout 160. In another embodiment, the information component 134 can be configured to derive multiple total values based on multiple viewing context in the interface model 110 and select a display layout 160 with the highest (or lowest in some implementations) total value as the determined display layout 160. In further embodiments, the information component 134 can also select the display layout 160 to be provided to the client device 102 in other suitable manners.

Upon receiving the user profile 112 and the display layout 160, the application 140 can be configured to output or surface the received user profile 112 in a user interface 146 according to the display layout 160. For instance, as shown in FIG. 1A, the user interface 146 can include a pop-up window. In other embodiments, the user interface 146 can also include a balloon, an overlay, or other suitable types of interface element. In the illustrated example in FIG. 1A, the user interface 146 includes a photo (or thumbnail thereof), a name (i.e., "Paul Smith"), a position (i.e., "Senior Engineer"), and an action (e.g., "Send email") of the person of interest. The user interface 146 also include multiple sections (shown as tabs for illustration purposes) that include "Contact," "Files," "Email," and "Calendar."

The sections of the user interface 146 can contain different category of information. For instance, as shown in FIG. 1A, the "Contact" tab can include basis contact information of the person, such as email address and work phone. The "Files" tab can include identifications of documents or other suitable types of files that the person has created, edited, viewed, forwarded, liked, or otherwise interacted with. The "Email" tab can include a number of emails exchanged between the user 101 and the person of interest. The "Calendar" tab can include a number of calendar items (e.g., appointments) of the person available for viewing by the user 101. In other examples, the user interface 146 can include a web page tab (e.g., Linkedin page of the person) and/or other suitable types of tabs. In further examples, each of the foregoing tabs may contain other suitable information in addition to or in lieu of the examples discussed above. The user interface 146 can also allow the user 101 to navigate to different tabs by, for instance, clicking on a tab, and add additional tabs by using, for example, the plus sign.

Figure 1B:
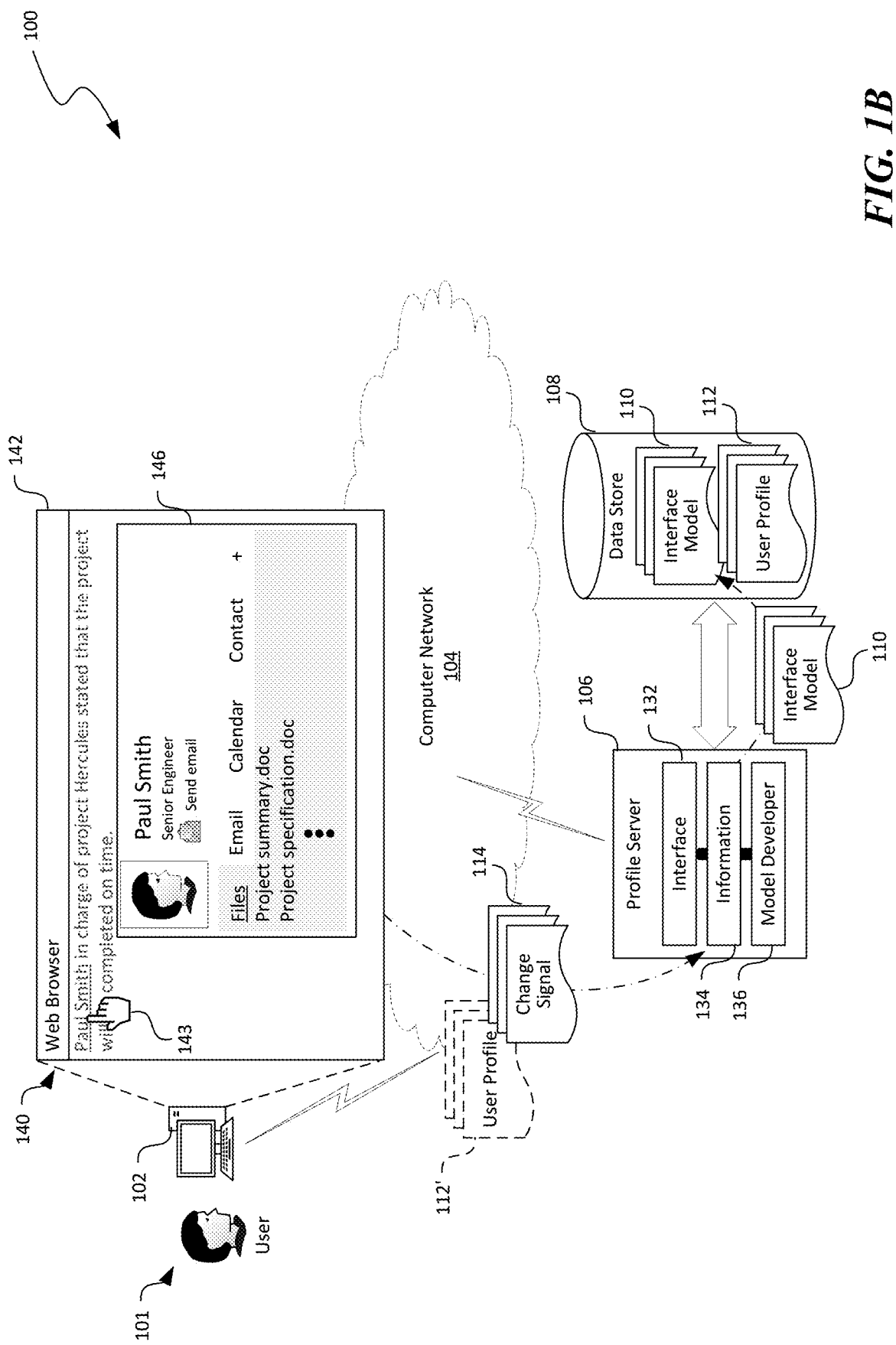

In accordance with embodiments of the disclosed technology, the model developer 136 can be configured to develop or update the interface model 110 in the data store 108 based on change signals 114 received from the client device 102. The change signals 114 indicate that the user 101 has modified the display layout 160 of the user interface 146 for outputting or surfacing the user profile 112. Such modifications can include the user 101 adding, removing, reordering, rearranging, or otherwise changing one or more tabs on the user interface 146. For example, as shown in FIG. 1A, the user 101 can reorder the tabs by dragging the "Contact" tab from a first position 145a (i.e., before "Files") to a second position 145b (i.e., after "Calendar"). As such, as shown in FIG. 1B, the application 140 can rearrange the tabs to show the "Files" tab as a first or default tab on the user interface 146.

Upon modifying the display layout 160 in the user interface 146 and/or detecting the modification, the application 140 can be configured to generate and transmit a change signal 114 indicating the detected change to the profile server 106. The change signal 114 can also include data identifying a change and/or detail of the modified display layout 160. In the illustrated embodiment, the application 140 can also transmit, with user consent, a user profile 112' of the user 101 and/or the person of interest to the profile server 106. In other embodiments, the user profile 112' can be retrieved from the data store 108 and/or obtained from an external source (not shown).

Based on the received change signal 114 and the user profile 112', the model developer 136 can be configured to develop and/or update the interface model 110 that can be used to predict a probability or other suitable indicators that another user would find the display layout 160 customized by the user 101 useful. In some embodiments, the model developer 136 can be configured to determine a set of weight values corresponding to various viewing context parameters of viewing context of the user 101 and a decision tree derived through a machine learning process. For example, the model developer 136 can be configured to identify the various weight values using a "neural network" or "artificial neural network" configured to "learn" or progressively improve performance of tasks by studying known examples. In certain implementations, a neural network can include multiple layers of objects generally refers to as "neurons" or "artificial neurons." Each neuron can be configured to perform a function, such as a non-linear activation function, based on one or more inputs via corresponding connections. Artificial neurons and connections typically have a contribution value that adjusts as learning proceeds. The contribution value increases or decreases a strength of an input at a connection. Typically, artificial neurons are organized in layers. Different layers may perform different kinds of transformations on respective inputs. Signals typically travel from an input layer, to an output layer, possibly after traversing one or more intermediate layers. In other implementations, the model developer 136 can also be configured to update the interface model 110 using feedback from the user 101 and other users (not shown) on the suggested display layout 160. In further embodiments, the model developer 136 can be configured to perform such model development/update based on administrator provided rules via linear regression or via other suitable techniques.

Figure 1C:
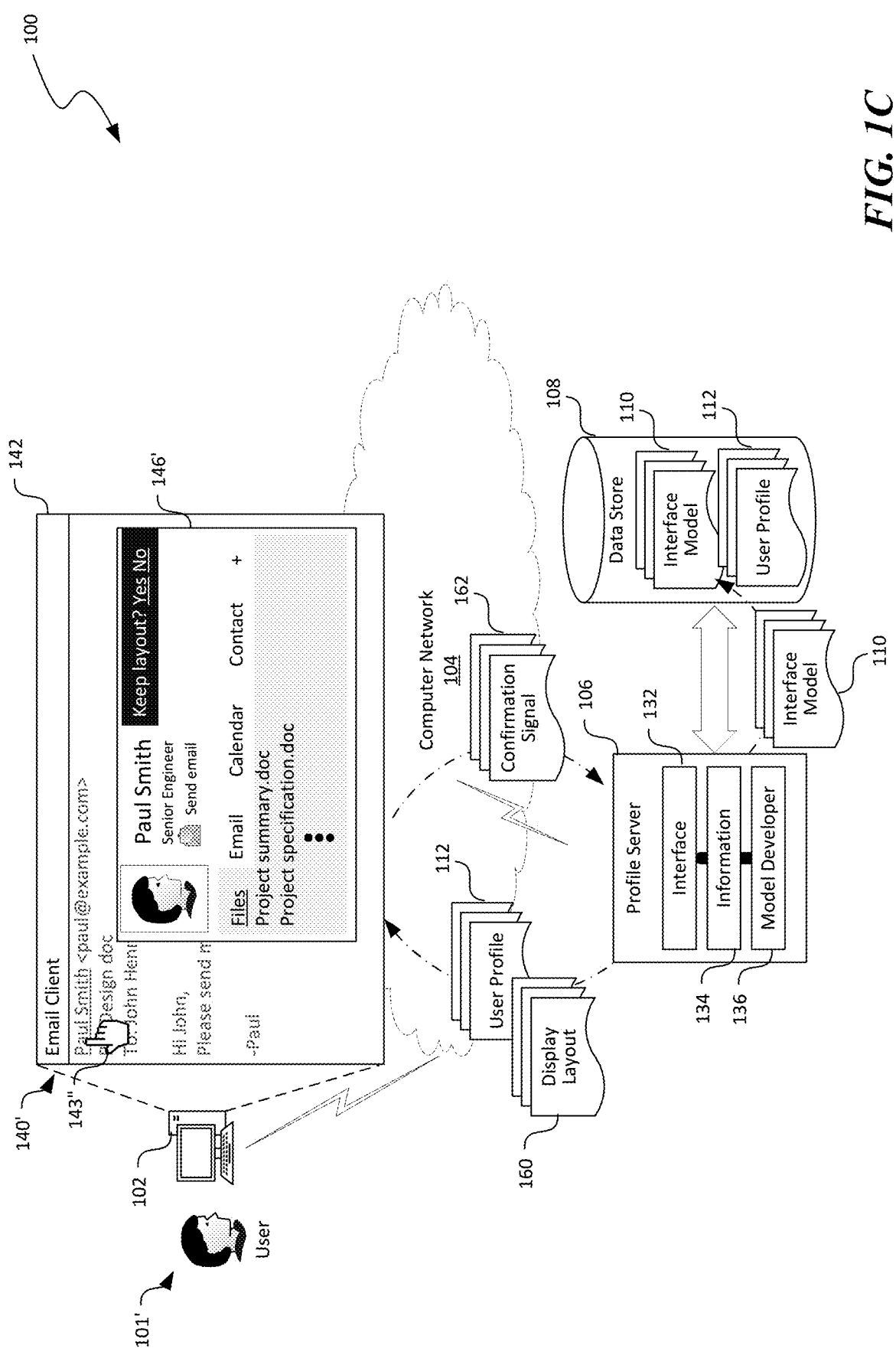

Through the machine learning process, viewing context of the users 101 and display layouts 160 can be clustered based on an intersection of the captured change signals 114 such as relationships to the user 101 and/or person of interest, interests of the user 101 and/or the person, and/or usage patterns of the user 101. During runtime, the profile server 106 can be configured to identify one or more display layouts 160 for other users 101 based on corresponding viewing context of the other users 101 and the interface model 110. The developed and/or updated interface model 110 can thus be used to provided suggested and/or automatically applied display layout 160 to other users 101 based on a similarity between viewing context of the users 101. For example, as illustrated in FIG. 1C, a client device 102 can execute suitable instructions to provide an email client 140' to display an email from the same person of interest (i.e., "Paul Smith") to the user 101'. Upon detecting a user input from the user 101' for profile information of the person of interest, for instance, as represented by the cursor 143", the email client 140' can transmit a request to the profile server 106 for profile information of "Paul Smith." In response, the information component 134 of the profile server 106 can determine whether a similarity level between a viewing context of the user 101' is sufficiently similar (e.g., exceeds a similarity threshold) to that of the user 101 in FIG. 1A. In response to determining that the viewing context are sufficiently similar, the information component 134 can be configured to provide the same display layout 160 and the user profile 112 to the email client 140' to be outputted or surfaced to the user 101' in another user interface 146'. As such, as shown in FIG. 1C, the user interface 146' can have the same arrangement of the tabs as well as the photo, name, title, etc.

In certain embodiments, the user interface 146' can also be configured to collect user feedback regarding the display layout 160. For example, as shown in FIG. 1C, the user interface 146' can include a prompt for input to the user 101', i.e., "Keep layout? Yes No." The user 101' can then click on either "Yes" or "No" to confirm or decline the suggested display layout 160. The email client 140' can then capture the foregoing user input as a confirmation signal 162 and transmit to the profile server 106. In turn, the model developer 136 of the profile server 106 can then update the interface model 110 in accordance with the confirmation signal 162.

Figure 1D:
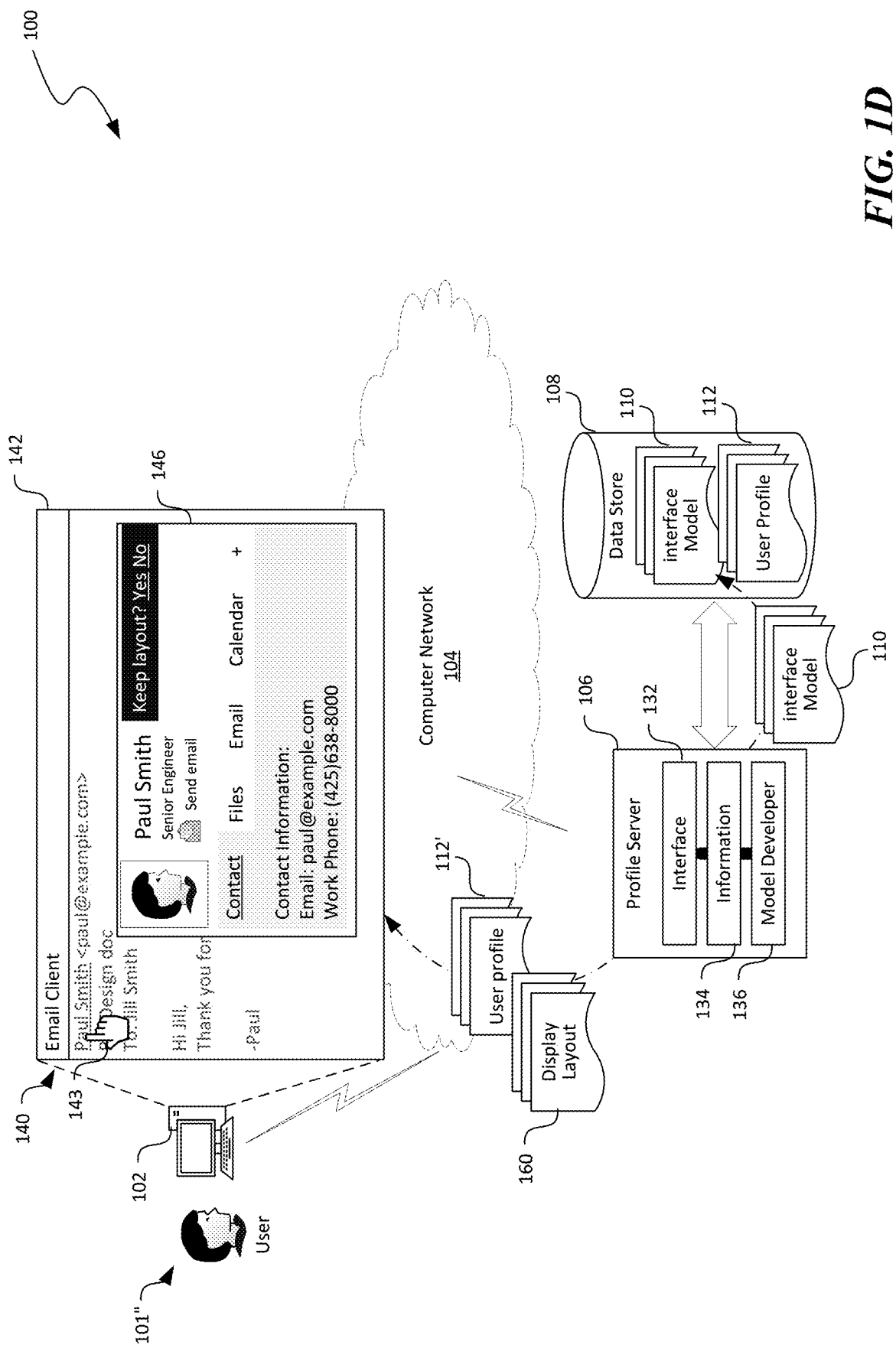

In response to determining that the viewing context are not sufficiently similar, the information component 134 can be configured to provide another display layout 160 and the user profile 112 to the email client 140' to be outputted or surfaced to the user 101' in the user interface 146'. For example, as shown in FIG. 1D, the user interface 146' can have the same arrangement of the tabs as well as the photo, name, title, etc. as the user interface 146 in FIG. 1A instead that in FIG. 1B, for illustration purposes.

Several embodiments of the disclosed technology can thus efficiently present profile information of a person of interest to users 101. Instead of statically presenting certain pre-configured profile information of the person of interest to a user 101, a display layout customized by another user 101 can be suggested and/or automatically applied for the user 101' based on a viewing context of the users 101 and 101' and the developed interface model 110. As such, the user 101' can more efficiently locate desired profile information of the person of interest with a small number of interactions with the user interface 146. Thus, a computing load and/or network bandwidth used by the client device 102 and/or profile server 106 for providing such a computing service may be reduced.

Figure 2:
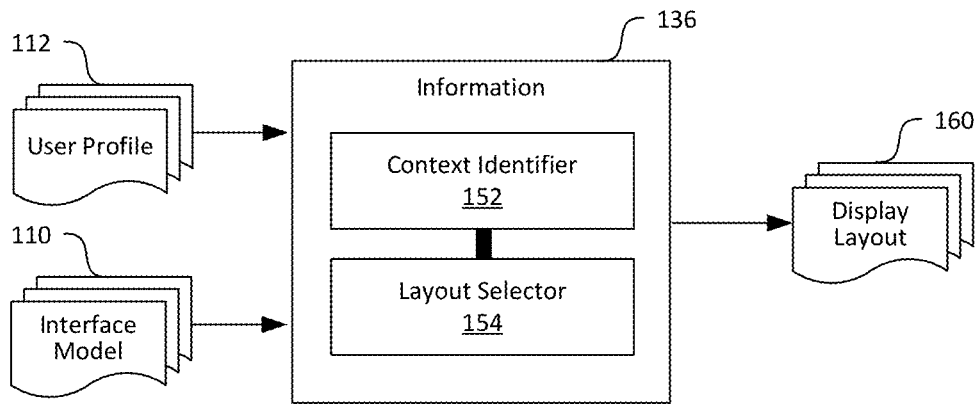
FIG. 2 is a schematic diagram illustrating hardware/software components of an information component in accordance with embodiments of the disclosed technology.

FIG. 2 is a schematic diagram illustrating hardware/software components of an information component 134 in accordance with embodiments of the disclosed technology. As shown in FIG. 2, the information component 135 can include a context identifier 152 and a layout selector 154 operatively coupled to each other. Though particular modules are shown in FIG. 2 for illustration purposes, in other embodiments, the information component 136 can include additional and/or different modules.

The context identifier 152 can be configured to identify various viewing context parameters from the user profile 112 of the user 101 (FIG. 1) and/or the person of interest (e.g., "Paul Smith" shown in FIG. 1A). For example, one viewing context parameter can be a relationship distance between the user 101 and the person of interest. In another example, a viewing context parameter can also include an industry/field the user 101 is in (e.g., finance, software, medicine, etc.), a title of the user 101 (e.g., software engineer, architect, assistant, doctor, lawyer, receptionist, insurance agent, artist, etc.), a role of the user 101 (e.g., manager, assistant, product manager, chief executive officer, etc.), a physical location the user 101 (e.g., the United States, Europe, Asia, etc.), and/or an education level of the user 101 (e.g., student, bachelor of science, doctor of philosophy, juris doctor, etc.), or other suitable information of the user 101. In further examples, a viewing context parameter can include a time of day of viewing activities by the user 101, a section of the user interface clicked by the user 101 most often, meetings the user 101 has attended or being invited to, topics discussed between the user 101 and the user via emails, instant messages, or other suitable electronic communication channels. Upon identifying the various viewing context parameters, the context identifier 152 can be configured to assign a numerical and/or other suitable type of value to the individual viewing context parameters and forward the assigned values to the layout selector 154 for further processing.

The layout selector 154 can be configured to identify a display layout 160 (FIG. 1A) based on a similarity between the viewing context of the user 101 and one or more other viewing context of users 101 in the interface model 110. As discussed above with reference to FIG. 1A-1D, in certain implementations, the interface model 110 can include weight values corresponding to each of the viewing context parameters. The layout selector 154 can apply the weight values to the viewing context parameters and derive a total value from the products of applying the weight values to the viewing context parameters. The layout selector 154 can then be configured to select one of the display layouts 160 in the interface model based on the total value in accordance with a preset threshold and/or other suitable criteria.

Figure 3A:
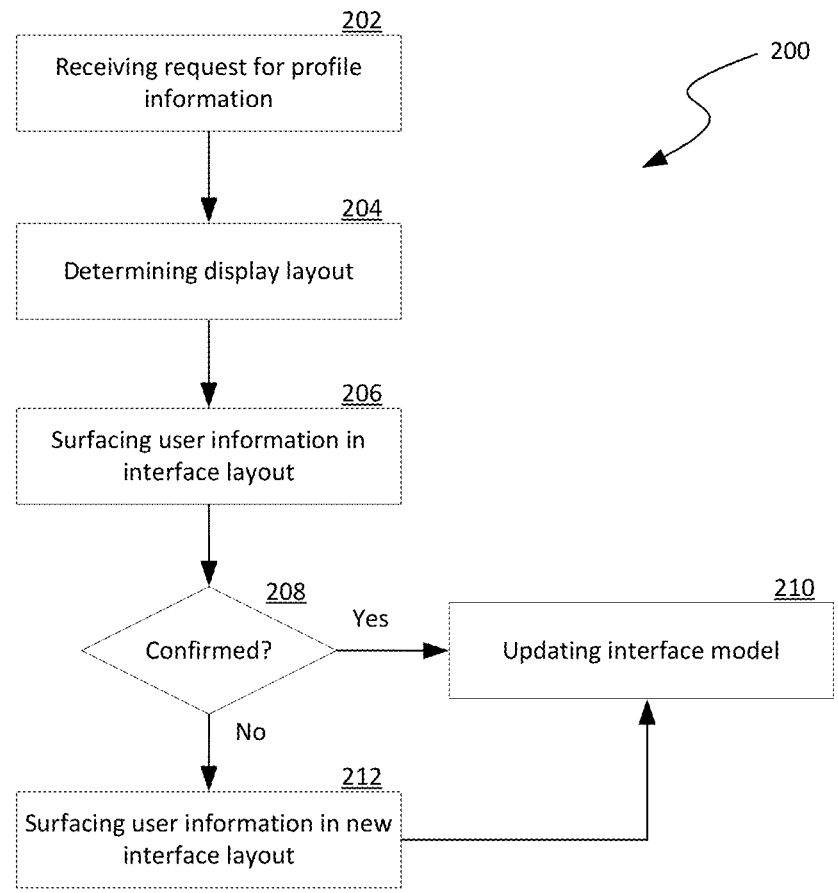
FIGS. 3A and 3B are flowcharts illustrating processes of customization of user interfaces in accordance with embodiments of the disclosed technology.
Figure 3B:
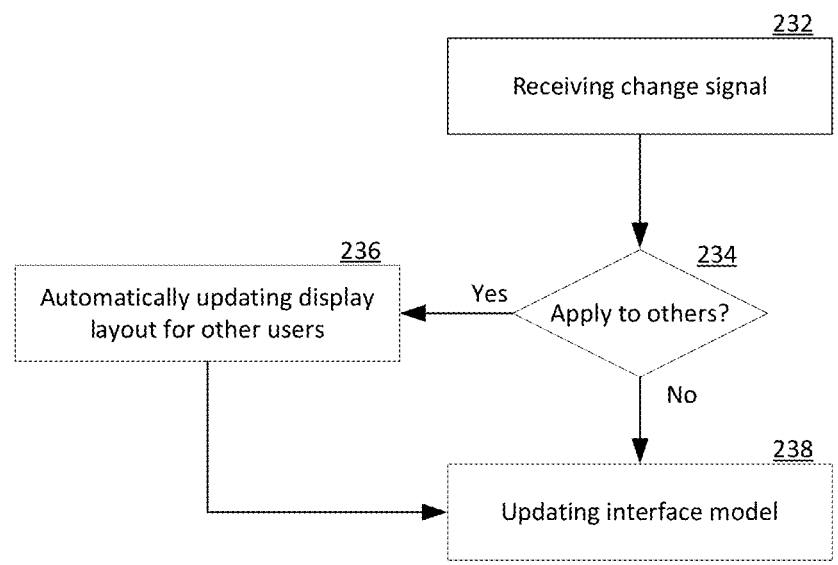

FIGS. 3A and 3B are flowcharts illustrating processes of customization of user interfaces in accordance with embodiments of the disclosed technology. Though the processes are described below in the context of the computing system 100, in other embodiments, the processes can also be implemented in computing system with additional and/or different components.

As shown in FIG. 3A, a process 200 can include receiving a request for profile information of a person of interest at stage 202. As discussed above with reference to FIG. 1A, such a request can be received from a client device 102 when an application 140 detects a user input (e.g., a mouseover) to a name of the person of interest. The process 200 can then include determining a display layout based on an interface model at stage 204. Several examples of performing such a determination are described above in more detail with reference to FIGS. 1A-1D. The process 200 can then include instructing the client device 102 to surface the profile information at stage 206. The process 200 can then include a decision stage 208 to determine whether the user 101 has confirmed the suggested display layout. In response to determining that the user 101 has confirmed the suggested display layout, the process 200 can include updating the interface model at stage 210; otherwise, the process 200 can include instructing the client device 102 to surface the profile information in a different display layout at stage 212 before updating the interface model at stage 210.

FIG. 3B illustrates example operations of applying a display layout to client devices of additional users. As shown in FIG. 3B, the operations can include receiving a change signal indicating a user change to a display layout for outputting profile information of a person of interest at stage 232. The operations can then include a decision stage 234 to determine whether to apply the change to additional users. The decision can be based on a rule configured by an administrator, a degree of change to the display layout, and/or other suitable criteria. In response to determining that the change is not to be applied to other users, the operations can include updating the interface model at stage 238. In response to determining that the change is to be applied to other users, the operations can include automatically updating a display layout on additional client devices of the additional users at stage 236 before updating the interface model at stage 238.

Figure 4:
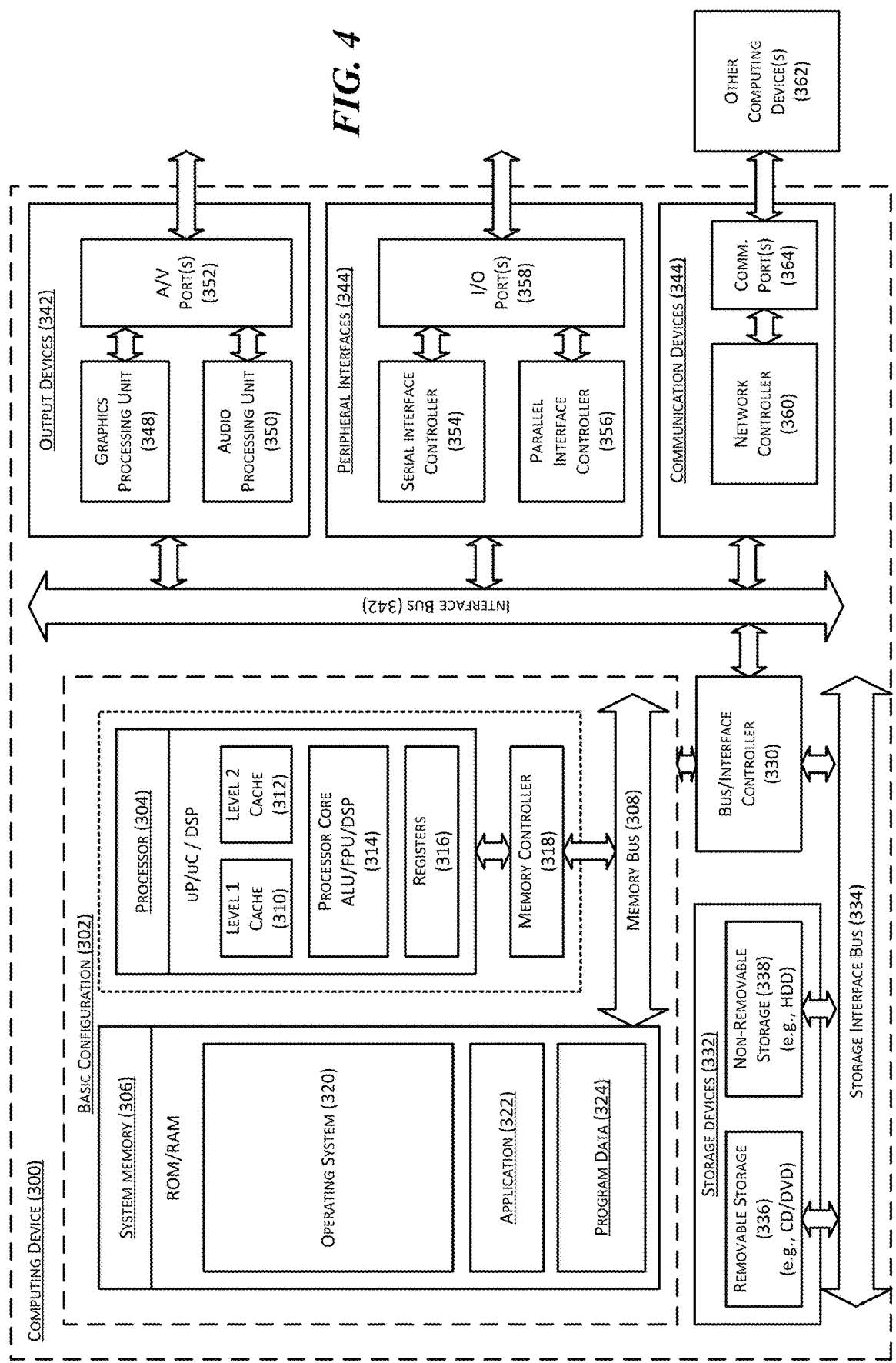
FIG. 4 is a computing device suitable for certain components of the computing system in FIGS. 1A-1D.

FIG. 4 is a computing device 300 suitable for certain components of the computing system 100 in FIGS. 1A-1D. For example, the computing device 300 can be suitable for the profile server 106 and/or the client device 102 of FIGS. 1A-1D. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for customization of user interfaces in a computing system having a server interconnected to client devices by a computer network, the method comprising:
   receiving, at the server, data representing a change signal from a first client device of a first user, the change signal indicating that the first user has modified a display layout of profile information of a person of interest viewed by the first user on the first client device; and
   in response to receiving the change signal, at the server,
      developing or updating an interface model representing a correlation between the modified display layout of the profile information and a viewing context of the first user, the viewing context of the first user comprising relationship information between the first user and the person of interest;
      determining a similarity level value between the viewing context of the first user and a viewing context of a second user, wherein the viewing context of the second user comprises relationship information between the second user and the person of interest;
      determining whether the similarity level value is above a preset threshold; and
      based on the determination that the similarity level value is above the preset threshold, automatically causing the modified display layout of the profile information to be displayed on a second client device corresponding to the second user upon receiving a request from the second user for viewing the profile information of the person of interest.

2. The method of claim 1, wherein the viewing context includes data representing one or more of a relationship between the first or second user and the person of interest, a profile of the first or second user, or a usage pattern of the first or second user related to viewing the profile information of the person of interest, wherein the relationship information between the first user and the person of interest includes a title of the first user and a title of the person of interest, and wherein the relationship information between the second user and the person of interest includes a title of the second user and the title of the person of interest.

3. The method of claim 1, wherein the profile information includes data representing one or more of contact information, previously exchanged emails between the first user and the person, a calendar of the person, or one or more documents associated with the person.

4. The method of claim 1, wherein:
   the display layout includes multiple sections; and
   the received data representing the change signal includes data indicating that the first user has added, removed, modified, reordered, or rearranged one of the sections.

5. The method of 1, claim wherein:
   the display layout includes multiple sections;
   the received data representing the change signal includes data indicating that the first user has added, removed, modified, reordered, or rearranged one of the sections; and
   developing or updating the interface model includes developing or updating the interface model between the modified display layout with the one of the sections added, removed, modified, reordered, or rearranged and the viewing context of the first user.

6. The method of claim 1, wherein:
   the display layout includes multiple sections;
   the received data representing the change signal includes data indicating that the first user has added, removed, modified, reordered, or rearranged one of the sections; and
   automatically causing the modified display layout to be displayed includes automatically causing the modified display layout to be displayed with the one of the sections added, removed, modified, reordered, or rearranged on the second client device upon receiving a request from the second user for viewing the profile information of the person of interest.

7. The method of claim 1, the method further comprising:
   developing or updating the interface model includes identifying a weight value individually for assigned numerical values corresponding to a relationship between the first user and the person of interest, a profile of the first user, and a usage pattern of the first user related to viewing the profile information of the person of interest; and
   multiplying the weight values to assigned numerical values corresponding to a relationship between the second user and the person of interest, a profile of the second user, and a usage pattern of the second user related to viewing the profile information of the person of interest;
   deriving a sum of products from the multiplying operation;
   determining whether the sum exceeds the preset threshold; and
   in response to determining that the sum exceeds the preset threshold, indicating the second user has a viewing context similar to that of the first user.

8. The method of claim 1, the method further comprising:
   developing or updating the interface model includes identifying a weight value individually for assigned numerical values corresponding to a relationship between the first user and the person of interest, a profile of the first user, and a usage pattern of the first user related to viewing the profile information of the person of interest; and
   multiplying the weight values to assigned numerical values corresponding to a relationship between the second user and the person of interest, a profile of the second user, and a usage pattern of the second user related to viewing the profile information of the person of interest;
   deriving a sum of products from the multiplying operation;
   determining whether the sum exceeds an additional preset threshold; and in response to determining that the sum exceeds the additional preset threshold, automatically causing the modified display layout of the profile information to be displayed on a second client device corresponding to the second user upon receiving a request from the second user for viewing the profile information of the person of interest.

9. The method of claim 1, further comprising in response to detecting the second user adopting the automatically caused to be displayed modified display layout, further customizing a view of the modified display layout in accordance with a usage pattern of the second user.

10. A computing device for customization of user interfaces in a computing system, the computing device comprising:
a processor; and
a memory operatively coupled to the processor, the memory containing an interface model representing a correlation between a display layout for outputting profile information of a person of interest to a first user and a viewing context of the first user, the viewing context of the first user comprising relationship information between the first user and the person of interest, the memory also having instructions executable by the processor to cause the computing device to:
determine a similarity level value between the viewing context of the first user and a viewing context of a second user, wherein the viewing context of the second user comprises relationship information between the second user and the person of interest;
determining whether the similarity level value is above a preset threshold; and
based on the determination that the similarity level value is above the preset threshold, automatically cause the display layout of the profile information in the interface model to be displayed on a second client device corresponding to the second user upon receiving a request from the second user for viewing the profile information of the person of interest.

11. The computing device of claim 10, wherein:
the display layout includes multiple sections; and
the memory contains additional instructions executable by the processor to cause the computing device to:
receive data representing a change signal indicating that a first user has added, removed, modified, reordered, or rearranged one of the sections; and
in response to receiving the data, updating the interface model in accordance with the received change signal to reflect the added, removed, modified, reordered, or rearranged one of the sections.

12. The computing device of claim 10, wherein:
the display layout includes multiple sections; and
the memory contains additional instructions executable by the processor to cause the computing device to:
receive data representing a change signal indicating that a first user has added, removed, modified, reordered, or rearranged one of the sections; and
in response to receiving the data, automatically cause the display layout of the profile information to be displayed in the interface model on the second client device to reflect the added, removed, modified, reordered, or rearranged one of the sections.

13. The computing device of claim 10, wherein:
the interface model identifies a weight value individually for assigned numerical values corresponding to a relationship between the first user and the person of interest, a profile of the first user, and a usage pattern of the first user related to viewing the profile information of the person of interest; and to identify the second user includes to:
multiply the weight values to assigned numerical values corresponding to a relationship between the second user and the person of interest, a profile of the second user, and a usage pattern of the second user related to viewing the profile information of the person of interest;
derive a sum of products from the multiplying operation;
determine whether the sum exceeds the preset threshold; and
in response to determining that the sum exceeds the preset threshold, indicate the second user has a viewing context similar to that of the first user.

14. The computing device of claim 10, the instructions further comprising:
identifying a weight value individually for assigned numerical values corresponding to a relationship between the first user and the person of interest, a profile of the first user, and a usage pattern of the first user related to viewing the profile information of the person of interest; and
multiplying the weight values to assigned numerical values corresponding to a relationship between the second user and the person of interest, a profile of the second user, and a usage pattern of the second user related to viewing the profile information of the person of interest;
deriving a sum of products from the multiplying operation;
determining whether the sum exceeds an additional preset threshold; and
to automatically cause the modified display layout to be displayed includes to automatically cause the modified display layout of the profile information to be displayed on a second client device corresponding to the identified second user upon receiving a request from the second user for viewing the profile information of the person of interest in response to determining that the sum does not exceed the preset threshold.

15. The computing device of claim 10, wherein the viewing context includes data representing one or more of a relationship between the first or second user and the person of interest, a profile of the first or second user, or a usage pattern of the first or second user related to viewing the profile information of the person of interest, wherein the relationship information between the first user and the person of interest includes an industry field of the first user and an industry field of the person of interest, and wherein the relationship information between the second user and the person of interest includes an industry field of the second user and the industry field of the person of interest.

16. The computing device of claim 10, wherein the profile information includes data representing one or more of contact information, previously exchanged emails between the first user and the person, a calendar of the person, or one or more documents associated with the person.

17. A method for customization of user interfaces in a computing system having a server interconnected to client devices by a computer network, the method comprising:

receiving, at the server, data representing multiple change signals from corresponding client devices of users in the computing system, the individual change signals indicating that a corresponding user has modified a display layout of profile information of a person of interest; and in response to receiving the change signals from the client devices, at the server, identifying a correlation between the modified display layouts of the profile information of the person of interest and viewing context of the corresponding users, the viewing context including data representing one or more of a relationship between the individual users and the person of interest, a profile of the individual users, or a usage pattern of the individual users related to viewing the profile information of the person of interest;

determining a similarity level value between the viewing context of a first user and a viewing context of a second user;

determining whether the similarity level value is above a preset threshold; and based on the determination that the similarity level value is above the preset threshold, automatically causing the modified display layout of the profile information to be displayed on another client device corresponding to the second user for outputting the profile information of the person of interest.

18. The method of claim 17, wherein:

the display layout includes multiple sections;

the received data representing the change signals includes data individually indicating that the corresponding user has added, removed, modified, reordered, or rearranged one of the sections; and the data of the relationship between the individual users and the person of interest includes a role of each individual user and a role of the person of interest.

19. The method of claim 17, wherein:

the display layout includes multiple sections;

the received data representing the change signals includes data individually indicating that the corresponding user has added, removed, modified, reordered, or rearranged one of the sections; and identifying the correlation includes updating the modified display layout with the one of the sections added, removed, modified, reordered, or rearranged by the corresponding user.

20. The method of claim 1, wherein:

the display layout includes multiple sections;

the received data representing the change signals includes data indicating that the corresponding user has added, removed, modified, reordered, or rearranged one of the sections; and to automatically cause the modified display layout to be displayed includes to automatically cause the modified display layout to be displayed with the one of the sections added, removed, modified, reordered, or rearranged on the additional client device.

* * * * *